US011830082B2

(12) United States Patent
West et al.

(10) Patent No.: US 11,830,082 B2
(45) Date of Patent: Nov. 28, 2023

(54) SYSTEMS AND METHODS FOR AIDING TAX COMPLIANCE

(71) Applicant: Thomson Reuters Enterprise Centre GmbH, Zug (CH)

(72) Inventors: Jon West, Addison, TX (US); Irish McIntyre, Cary, NC (US)

(73) Assignee: THOMSON REUTERS ENTERPRISE CENTRE GMBH, Zug (CH)

( * ) Notice: Subject to any disclaimer, the term of this patent is extended or adjusted under 35 U.S.C. 154(b) by 0 days.

(21) Appl. No.: 16/402,389

(22) Filed: May 3, 2019

(65) Prior Publication Data
US 2019/0340703 A1    Nov. 7, 2019

Related U.S. Application Data

(60) Provisional application No. 62/666,748, filed on May 4, 2018.

(51) Int. Cl.
| | | |
|---|---|---|
| *G06Q 40/12* | (2023.01) | |
| *H04L 9/06* | (2006.01) | |
| *H04L 9/00* | (2022.01) | |

(52) U.S. Cl.
CPC ......... *G06Q 40/123* (2013.12); *H04L 9/0637* (2013.01); *H04L 9/0643* (2013.01); *H04L 9/50* (2022.05); *H04L 2209/56* (2013.01)

(58) Field of Classification Search
CPC .... G06Q 40/123; G06Q 20/00; H04L 9/0637; H04L 9/0643; H04L 2209/56
See application file for complete search history.

(56) References Cited

U.S. PATENT DOCUMENTS

| | | | | |
|---|---|---|---|---|
| 5,420,405 | A * | 5/1995 | Chasek | G06Q 20/10 |
| | | | | 235/379 |
| 11,232,521 | B2 * | 1/2022 | Benson | G06Q 40/123 |
| 2002/0048369 | A1 * | 4/2002 | Ginter | G07F 9/026 |
| | | | | 380/277 |
| 2005/0060584 | A1 * | 3/2005 | Ginter | H04N 21/8355 |
| | | | | 726/4 |
| 2006/0218651 | A1 * | 9/2006 | Ginter | H04N 21/2543 |
| | | | | 726/27 |
| 2008/0294538 | A1 * | 11/2008 | Barsade | G06Q 40/02 |
| | | | | 705/31 |

(Continued)

OTHER PUBLICATIONS

Antonopoulos, A. "Mastering Bitcoin—Unlocking Digital Cryptocurrencies", O'Reilly Media, Beijing Cambridge Farnham Koln, ISBN: 978-1-4493-7404-4, Ch.5, Ch. 6, dated Dec. 20, 2014.

(Continued)

*Primary Examiner* — Michael Jared Walker
(74) *Attorney, Agent, or Firm* — Alston & Bird LLP

(57) ABSTRACT

The present disclosure is directed towards systems and methods for aiding compliance with tax collection and reporting obligations. Distributed ledgers may assist with the verified calculation of taxes owed through the use of identity wallets and cryptocurrency transactions may be employed to effectuate payment to sellers as well as payment of taxes owed to the appropriate tax authorities. Verification of identity sources and of tax calculation and transmission engines may reduce compliance obligations on the part of sellers.

8 Claims, 15 Drawing Sheets

(56) References Cited

U.S. PATENT DOCUMENTS

| | | | | |
|---|---|---|---|---|
| 2011/0022485 | A1* | 1/2011 | Von Drehnen | G06Q 20/40 |
| | | | | 705/19 |
| 2011/0047055 | A1* | 2/2011 | Funk | G06Q 30/04 |
| | | | | 705/34 |
| 2014/0250005 | A1 | 9/2014 | Amacker et al. | |
| 2014/0379531 | A1* | 12/2014 | Huang | G06Q 20/207 |
| | | | | 705/26.81 |
| 2015/0220928 | A1* | 8/2015 | Allen | G06Q 20/3829 |
| | | | | 705/67 |
| 2015/0294425 | A1* | 10/2015 | Benson | G06Q 40/123 |
| | | | | 705/31 |
| 2017/0017954 | A1* | 1/2017 | McDonough | G06Q 20/384 |
| 2017/0024715 | A1* | 1/2017 | Gardner | G06Q 10/00 |
| 2017/0046792 | A1* | 2/2017 | Haldenby | H04L 9/0891 |
| 2017/0228731 | A1* | 8/2017 | Sheng | G06Q 20/401 |
| 2018/0101914 | A1* | 4/2018 | Samuel | G06Q 20/102 |

OTHER PUBLICATIONS

International Search Report and Written Opinion for Application No. PCT/IB2019/053645 dated Sep. 20, 2019.
$1^{st}$ Examination Report for New Zealand Application No. 769369 dated Oct. 28, 2021 (5 pages).
Examination Report for Canadian Patent Application No. 3,098,101 dated Jan. 20, 2022 (4 pages).
International Preliminary Report on Patentability for PCT/ID2019/053645 dated Nov. 10, 2020 (7 pages).
$1^{st}$ Office Action for EP Application No. 1973244.5 dated Mar. 3, 2022 (8 pages).
$2^{nd}$ Office Action for EP Application No. 19732444.5 dated Feb. 21, 2023 (10 pages).
Examiner's Report for Canadian Application No. 3,098,101 dated Jan. 26, 2023 (6 pages).

* cited by examiner

SYSTEMS AND METHODS FOR AIDING TAX COMPLIANCE

CROSS-REFERENCE TO RELATED APPLICATIONS

This application claims the benefit of and priority to U.S. Provisional Application No. 62/666,748, filed May 4, 2018, which is hereby incorporated by reference in its entirety.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

BACKGROUND

Consumption tax compliance has traditionally been a laborious process placing significant overhead on governments and businesses. In addition, current systems experience an enormous amount of fraud and tax evasion. The present innovations seek to aid in correcting these issues.

Consumption tax accounts for taxes levied on consumption spending on goods and services. Most consumers pay little attention to these taxes as they are often seen as routine and customary. While going unnoticed by most consumers, Consumption tax accounts for a large portion of the tax base for most developed countries. In 2014 Consumption tax accounted for 30% of all tax revenue on average among Organization for Economic Co-operation and Development (OECD) countries. These taxes are usually indirect, such as a sales tax or a Value Added Tax (VAT). The modem day consumption tax was designed for the era of physical goods, local services, and limited cross border trade. The latest evolutions in consumption tax include eInvoicing and Standard Audit File for Tax (SAF-T). Businesses report and file transaction data to a centralized tax authority database which in turn issues audits on a case by case basis.

The most popular consumption tax is the VAT. The OECD stipulates "The overarching purpose of a VAT is to impose a broad-based tax on consumption, which is understood to mean final consumption by households." VAT is an indirect tax that functions based on an incentive system in which every entity in a transaction is taxed and passes on the cost up the supply chain, thus VAT places a tax at each step based on the value that was added during each stage of production and distribution.

Most countries with a VAT system employ the credit-invoice method, shown generally in FIG. 1, in which all sales by a business are taxable, but the seller's pass on invoices to the VAT-compliant businesses who purchases goods and services from them. The businesses in turn claim a credit for taxes paid on their purchases, but then pay VAT on the full value of their sale. The result of this equates to no taxes on sales between businesses in the supply chain while the full value of the VAT tax is levied on the final consumer. For example, in FIG. 1, a consumer purchases a good for $1.69, $0.19 of which is remitted by the retailer as a tax to the government. Similarly, the retailer pays a manufacturer $1.32, 0.12 of which is remitted to as a tax to the government. In the same way, a manufacturer pays $1.08 to a raw materials producer, $0.08 of which is remitted by the raw material producer to the government as a tax.

This tax along the supply chain is done to create a financial incentive for the retailer to charge tax. That is, the retailer must charge tax to the consumer in order for said retailer to get back the VAT they paid to the wholesaler or manufacturer. This incentive structure works its way up the supply chain. This complex and burdensome system is in place to ensure one thing; at final sale the consumer is charged VAT.

In October 2008 Satoshi Nakamoto published "Bitcoin: A Peer-to-Peer Electronic Cash System" which evoked a revolution in Distributed Ledger Technology (DLT) and introduced cryptocurrencies to the world. Building on top of the innovations of Bitcoin, Vitalik Buterin created Etherium in July 2015. Since that time cryptocurrencies have seen an unprecedented level of proliferation over the past few years with the total market capitalization of the crypto market reaching $800 billion by late 2017. Even governments have proposed state backed crypto currencies.

The proliferation of cryptocurrencies and DLT shows promise and is beginning to catch on with observers drawing parallels with the 90's Internet boom. Increasingly so people are viewing cryptocurrencies as an alternative form of value to native fiat currencies with 8 percent of Americans owning them. The Boston Federal Reserve has estimated that 75% of US consumers who own cryptocurrencies have used them for payments within a 12 month period. This trend of adoption and usage is likely to continue in the coming years as the space matures and regulations become clearer. One key trend that underpins the rise of cryptocurrencies is the disintermediation of payment systems. The rationality behind this is that traditional payment systems that rely on legacy banking are not nearly as efficient as cryptocurrencies. Furthermore, it is likely that "know your customer" laws and other anti-money laundering requirements can be better met when using cryptocurrencies. Roel Steenbergen, the head of technology innovation at Dutch based RaboBank postulates that "Instead of today's payments system in which people play a big role, there will be a fully automated system based on a smart mathematical model that makes transactions checkable and indisputable." It can be understood that in such a future in which cryptocurrencies and DLT based systems experience mass adoption then there will be billions, if not more, transactions that take place on these systems and many of these transactions will be taxable events on goods and services. How does a legacy tax system that relies on manual calculation and remittance adopt to a decentralized system that facilitates billions of transactions? The current VAT system is ill equipped to tackle such a challenge.

The advancement in DLT has also given birth to new possibilities of human organization in the form of the Decentralized Autonomous Organization (DAO). DAO's fundamentally change the conventional relationship between employees, customers, and shareholders that has been in place for a millennia. The traditional business model functions on a fundamental mismatch between all parties. Shareholders seek to extract the maximum amount of return, employees are incentivized to extract the maximum personal profit in the form of compensation thus motivating them to extract the maximum amount of value from customers. The DAO seeks to fundamentally alter this system of incentives by disintermediating the hierarchy of traditional systems and distributing ownership across all participants. This will lead to further levels of automation and the expectation that tax also be automated. Systems such as DAO's require yet nonexistent infrastructure in order to facilitate commerce while staying compliant.

The current state of VAT laws are summed up well in the comments of EU tax commissioner Pierre Moscovici; "VAT [laws] are a quarter of a century old and no longer fit for purpose."

VAT laws have evolved extensively over the past decades, but have yet to advance in such a way as to deal most effectively with virtual goods and services, cross-border trade, digital borderless economies, IOT devices, the sharing economy, and the latest advancement in technology—DLT and cryptocurrencies. This lack of advancement has been noted by the OECD which has stated; "The Digital economy magnifies these challenges, as the evolution of technology has dramatically increased the capability of private consumers to shop online and the capability of businesses to sell to consumers around the world without the need to be present physically or otherwise in the consumer's country." This failure to adapt to the emerging digital economy places a large burden on business and government alike as well as stagnates technological progress. Not only do we observe a decreased rate of adaptation to a quickly changing landscape but also a large margin of fraud and overhead.

One of the world's largest accounting firms PricewaterhouseCoopers concluded in a study that the average business requires 125 hours to comply with VAT. 82 of these hours relates to preparation activities, 24 hours are spent carrying out filling activities, and the remaining 19 hours are spent on payment activities. In addition to time spent the average business spends $15,000 a year on compliance costs alone. This is due to the fact that the current system imposes a large overhead on them. Currently, the way consumption tax is collected is cumbersome and inefficient. At the point of sale, tax is determined during the transaction and then is followed up upon 1-3 months later, essentially duplicating previous effort. Authorities then again determine the proper tax on these transactions in order to determine the validity of tax payments. In summary, we "determine" consumption tax three times: first at the time of the transaction; then during compliance; and finally, when the tax authority receives the transactions.

Governments of the world bear a large burden in the form of oversight and lack of compliance. The loss associated with VAT fraud and lack of compliance is known as the VAT Gap. The VAT Gap is the difference between expected VAT revenues and VAT collected. This issue becomes apparent across the EU-27 block which is calculated to lose $151 billion annually on lost VAT revenue. This loss accounts for 12% of total expected VAT revenue. It is estimated that globally $1-2 trillion dollars' worth of VAT tax goes uncollected each year. This figure does not include uncollected US sales tax. These figures paint a picture of endemic failure of the current system to tackle the challenges of oversight. Across OECD governments VAT accounts for an average of 20% of GDP. Considering that Consumption Tax accounts for such a large portion of total tax revenue a minor increase in remittance would have outsized effects on GDP.

Another form of VAT fraud can take the form of "Missing Trader Fraud" in which the perpetrator charges VAT on the sale of goods, and then instead of paying this over to the government's collection authority the perpetrator pockets the funds.

A consideration to make when assessing the current VAT system are its effects on developing countries. Due to inefficiency and large overhead associated with regulatory oversight and tax compliance, the current system of VAT is, at best, expensive for developed countries and, at worst, impossible for developing countries that lack robust infrastructure.

The current system fails to scale adequately with new technological innovations such as IOT. The global IOT market is set to grow to $457 billion by 2020 with the B2B IOT segment generating in excess of $300 billion. This will account for over 30 billion connected devices and 5.4 billion B2B connected devices by 2020. Many of these devices will carry out financial microtransactions in the form of wide-scale machine-to-machine transactions. This unprecedented growth will bring with it perhaps billions of transactions which will require a frictionless tax solution that the current model is ill equipped to cope with.

The current VAT system exposes the private information of millions of individuals and businesses by storing personal and business financial information in centralized public and private databases. In a 2015 cyber hack perpetrated on the IRS exposed over 700,000 taxpayer accounts. Hackers were able to gain access to Social Security numbers, birth dates and income history. Other major breaches of personal information such as the 2017 Equifax data breach which exposed 145 million American citizens' personal information, highlight the risks of storing personal and businesses' financial information in centralized systems. This is currently the case regardless of the fact that the individual or entity may be willfully compliant. Consideration could be made to those individuals or entities who opt-in to a fully tax compliant system thereby having their privacy protected. Citizens would only have to expose their private information to government agencies when irregularities trigger such an action.

For the calculation of VAT across multiple jurisdictions, for example cross border trade, the destination principle is used. The destination principle allows for VAT to be retained by the jurisdiction in which the taxed good or service is being sold such that a nation that exports is not subject to tax with input taxes being refunded and imports being taxed on the same basis as domestic supply. In contrast to the destination principle, under the origin principle each jurisdiction would levy VAT on the value created within its own borders. Generally speaking, goods exported within the EU are eligible to be "Zero VAT rated". "Zero VAT rated" refers to any paid VAT that can be reclaimed. The process of reclaiming this VAT on exports can be a laborious process that requires special attention in order to ensure compliance and tax efficiency. Recognizing this the OECD states "Cross-border trade in goods, services and intangibles create challenges for VAT systems, particularly where such products are acquired by private consumers from suppliers abroad."

Accordingly, the new tools for aiding in tax compliance will improve the efficiency and accuracy of complying with tax reporting requirements, especially as they relate to cryptocurrency transactions.

In order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BRIEF SUMMARY

The present innovations generally address systems and methods for aiding tax compliance.

In one aspect according to one embodiment, a method for calculating and remitting tax obligations, comprises receiving an identification of an item to be purchased, receiving an identification of an identity wallet for a purchaser, the identity wallet having been verified by a government of an agent thereof, using the identification of the purchaser's identity wallet, obtaining verified information from the purchaser's identity wallet, using the verified information from the purchaser's identity wallet, together with the identification of the item to be purchased, calculating a tax owed and a taxing authority to which the tax is owed, based on the identification of the item to be purchased, initiating a first cryptocurrency transaction to transfer a purchase price of the item to a seller of the item, and initiating a second cryptocurrency transaction to transfer the tax owed to a tax reserve owned by the taxing authority to which it is owed.

In another example, the second cryptocurrency transaction is recorded in a smart contract on a distributed ledger.

In yet another example, the identity wallet is recorded on a distributed ledger.

In a further example, the method further comprises identifying to the purchaser which verified information is to be retrieved from the purchaser's identity wallet and only retrieving said verified information is consent is received from the purchaser to do so.

In a further example, the method further comprises obtaining verified information about a seller from which the item is to be purchased from an identity wallet of the seller that has been verified by a government or an agent thereof, wherein the calculation of the tax owed and the taxing authority to which it is owed is also based on the verified information from the seller's identity wallet.

In a further example, the method further comprises presenting the result of the calculation of the tax owed to the purchaser and proceeding with the first and second cryptocurrency transactions only if consent is received from the purchaser to do so after having been presented the calculation result.

In a further example, a tax calculation engine employed to perform the calculation of tax owed is verified by a government or its agent.

In a further example, a transaction initiation engine employed to perform at least the second cryptocurrency transaction if verified by a government or its agent.

In a further example, the second cryptocurrency transaction records, in addition to the transfer of tax owed, an identification of the purchaser and seller involved in the transaction.

In a further example, the tax reserve is configured with a predetermined reserve threshold and any tax transferred to the tax reserve in excess of the tax reserve is transferred to one or more other reserves owned by the tax authority.

In a further example, the method further comprises receiving an item return request from the purchaser indicating a returned item and an identification of the first and second cryptocurrency transactions made in connection with the initial purchase of the item and initiating a third cryptocurrency transaction with the tax reserve including the identification of the second cryptocurrency transaction as well as an identification of the returned item to transfer an amount of the tax initially transferred via the second cryptocurrency transaction that is attributable to the returned item back to the purchaser from the tax reserve.

BRIEF DESCRIPTION OF THE DRAWINGS

The accompanying drawings illustrate various non-limiting, example, innovative aspects in accordance with the present descriptions.

DETAILED DESCRIPTION

Figure 1:
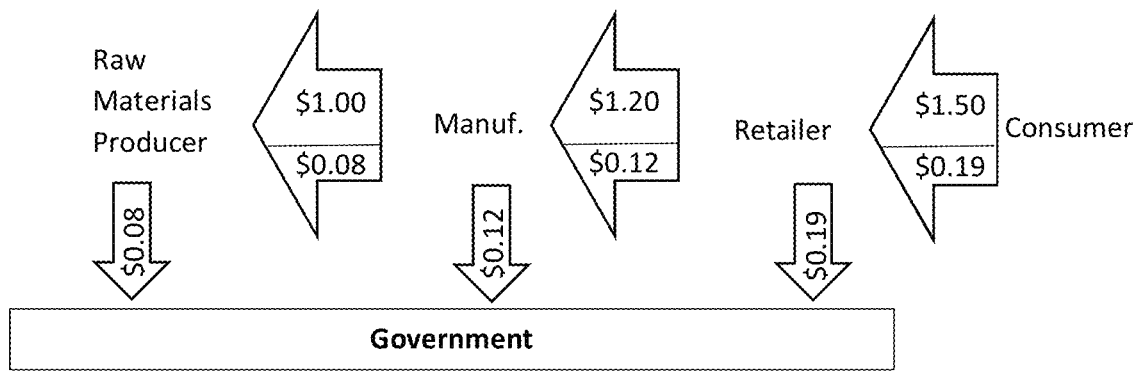
FIG. 1 shows a block diagram illustrating an exemplary existing consumption tax collection scheme.

Embodiments of systems and methods for aiding tax compliance are described herein. While aspects of the described tax compliance aiding systems and methods can be implemented in any number of different configurations, the embodiments are described in the context of the following exemplary configurations. The descriptions and details of well-known components and structures are omitted for simplicity of the description, but would be readily familiar to those having ordinary skill in the art.

The description and figures merely illustrate exemplary embodiments of the inventive tax compliance aiding systems and methods. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventors to furthering the art, and are to be construed as being without limitation to such specifically recited examples and conditions. Moreover, all statements herein reciting principles, aspects, and embodiments of the present subject matter, as well as specific examples thereof, are intended to encompass all equivalents thereof.

For example, the description provided herein generally describes the inventions with respect to a consumption-based value added tax, but one skilled in the art will appreciate that the inventions may be applied to other types of tax regimes as well including, for example, sales tax, goods and services tax, payroll tax, property tax, etc. As another example, the present description focuses its discussion on an application to transactions involving cryptocurrency, however one skilled in the art will appreciate that the inventions are applicable to other types of transactions as well.

In general, the systems and methods described herein may relate to improvements to aspects of manipulating information using a computer. These improvements not only improve the functioning of how such a computer (or any number of computers employed in the search) is able to operate to serve the user's goals, but also improves the accuracy and efficiency of the user's interactions and submissions with taxing authorities.

In one embodiment, the inventive system may be configured to ensure consumption tax compliance using distributed ledger technology. In one example, the inventive system considers the sovereign identity of individuals and businesses in order to calculate and remit consumption tax, which can largely eliminate today's compliance and audit processes. With the systems and methods described herein, businesses no longer need to calculate and collect tax, nor fear audits. The innovations described herein improve data privacy, expand tax bases, streamline and lower costs associated with tax compliance, bolster global trade, and reduce government bureaucracy.

In one embodiment, a vendor may create a tax tool that eCommerce, Point-of-Sale, etc. systems can utilize. The tool may be certified by a governmental tax authority, its designee or an accounting firm or other specialized type of firm prior to use so that it can be relied upon by businesses and government alike to provide a guaranteed calculation, collection and remittance of the correct consumption tax amount.

In one aspect, the establishment of verified identity wallets by governmental bodies enables the inventive system a way to efficiently obtain verified information with minimal privacy concerns. In order to determine the attribution for tax payments and individual tax statuses it is important to have a verified source of identity information for business and individuals participating in the transaction.

An identity wallet may also be established by a governmental body or other trusted agency and provided to consumers and sellers in a market. Such an identity wallet may utilize distributed ledger technology. Such an identity wallet is a verified repository for information about the consumer relevant for tax purposes, but protected in a way that complies with applicable personal information privacy laws. Because the information contained in an identity wallet will have been verified by the government or its trusted agent, the information contained therein may be assumed to be accurate for tax compliance purposes. The information contained in the identity wallet includes, for example, the consumer's residence location information, any applicable tax exemption or reduction status, etc. In another example, a consumer's identity wallet may be configured to retain information regarding their personal preferences, for example their past shopping history, consumption address, and other data that may be used to finalize a sale. In a similar fashion, each seller also has an identity wallet to hold the relevant information of the seller. If a person or entity makes both purchases and sales, one identity wallet may be used for both purposes.

The viability of a blockchain based identity system that is verified by government authorities has been tested in Zug, Switzerland. The city of Zug issued a Zug ID that acts as a certificate of digital citizenship. In another example, a service known as UPort enables individuals and businesses to obtain a sovereign digital identity that can be verified by governments.

Figure 5:
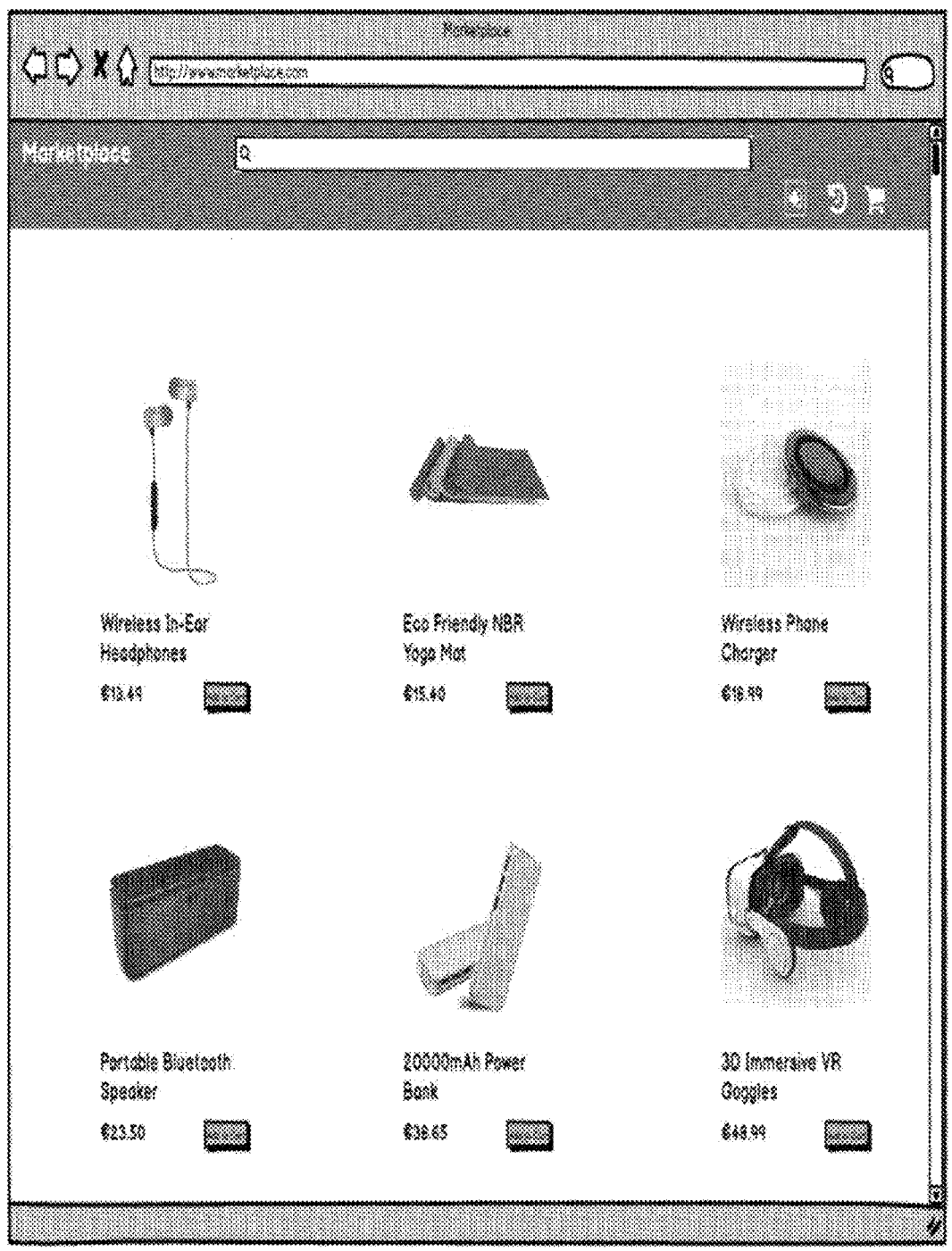
FIG. 5 shows an example of an online eCommerce marketplace according to an exemplary embodiment.
Figure 6:
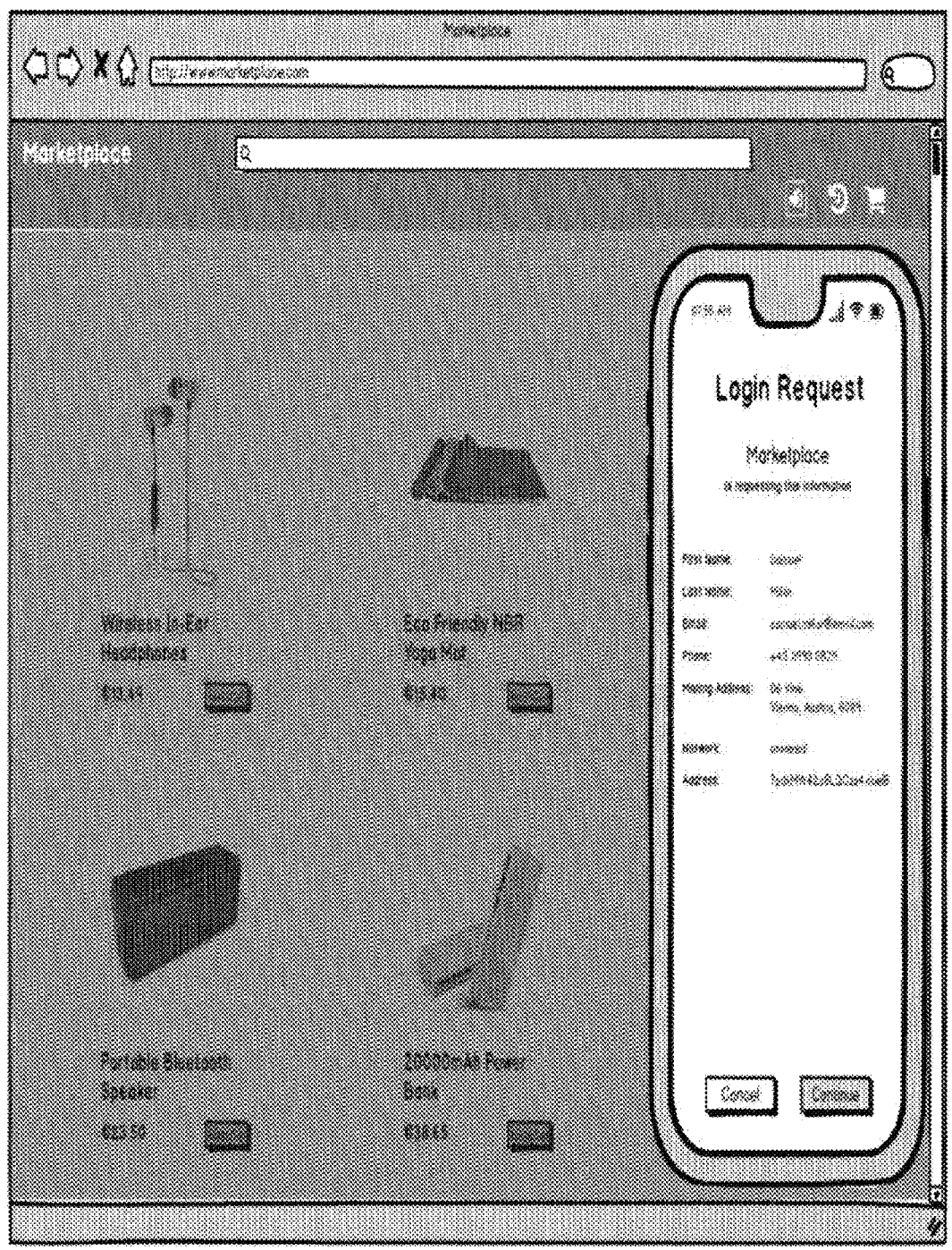
FIG. 6 shows an example of a login request on an online eCommerce marketplace according to an exemplary embodiment.
Figure 7:
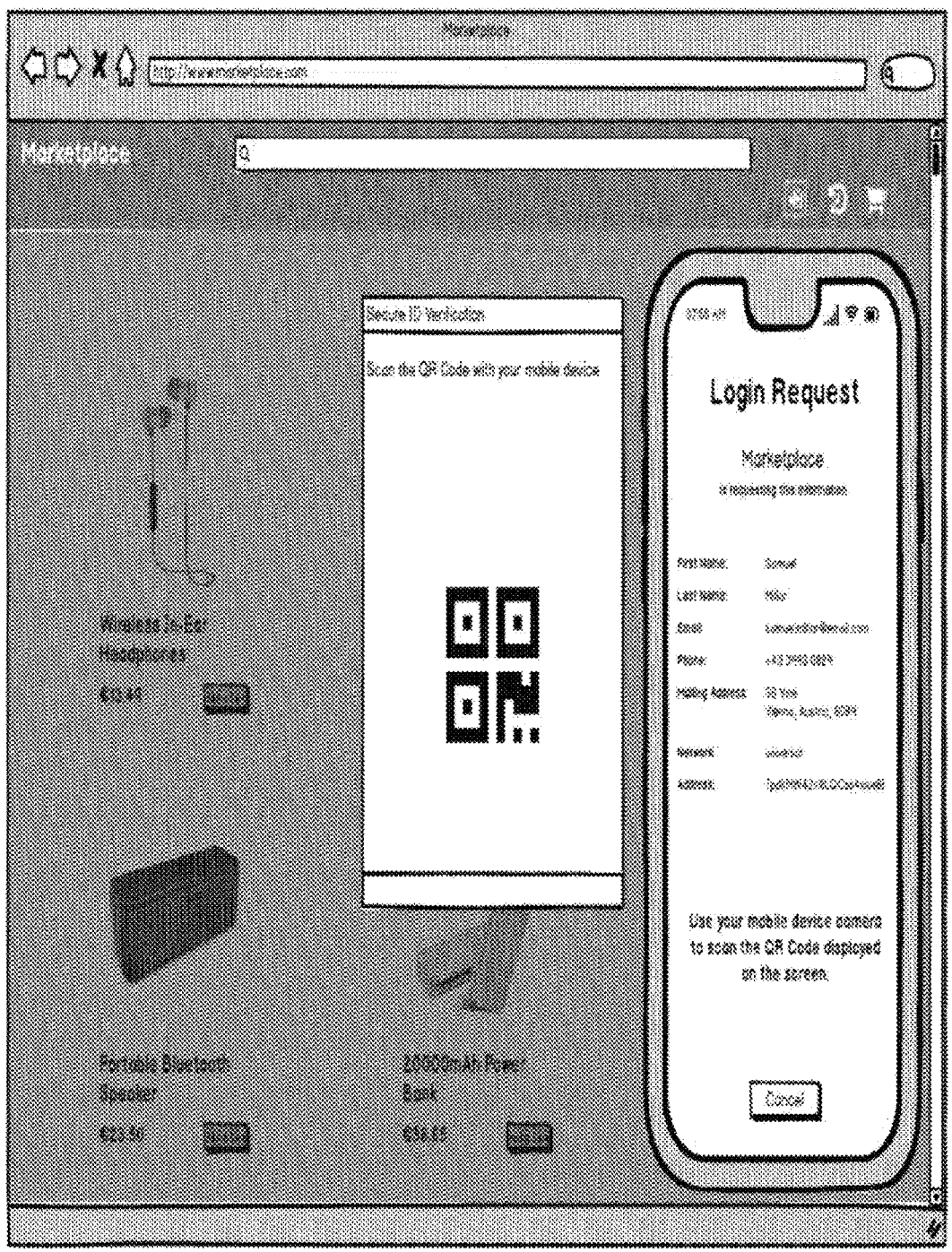
FIG. 7 shows an example of an identification verification request on an online eCommerce marketplace according to an exemplary embodiment.
Figure 8:
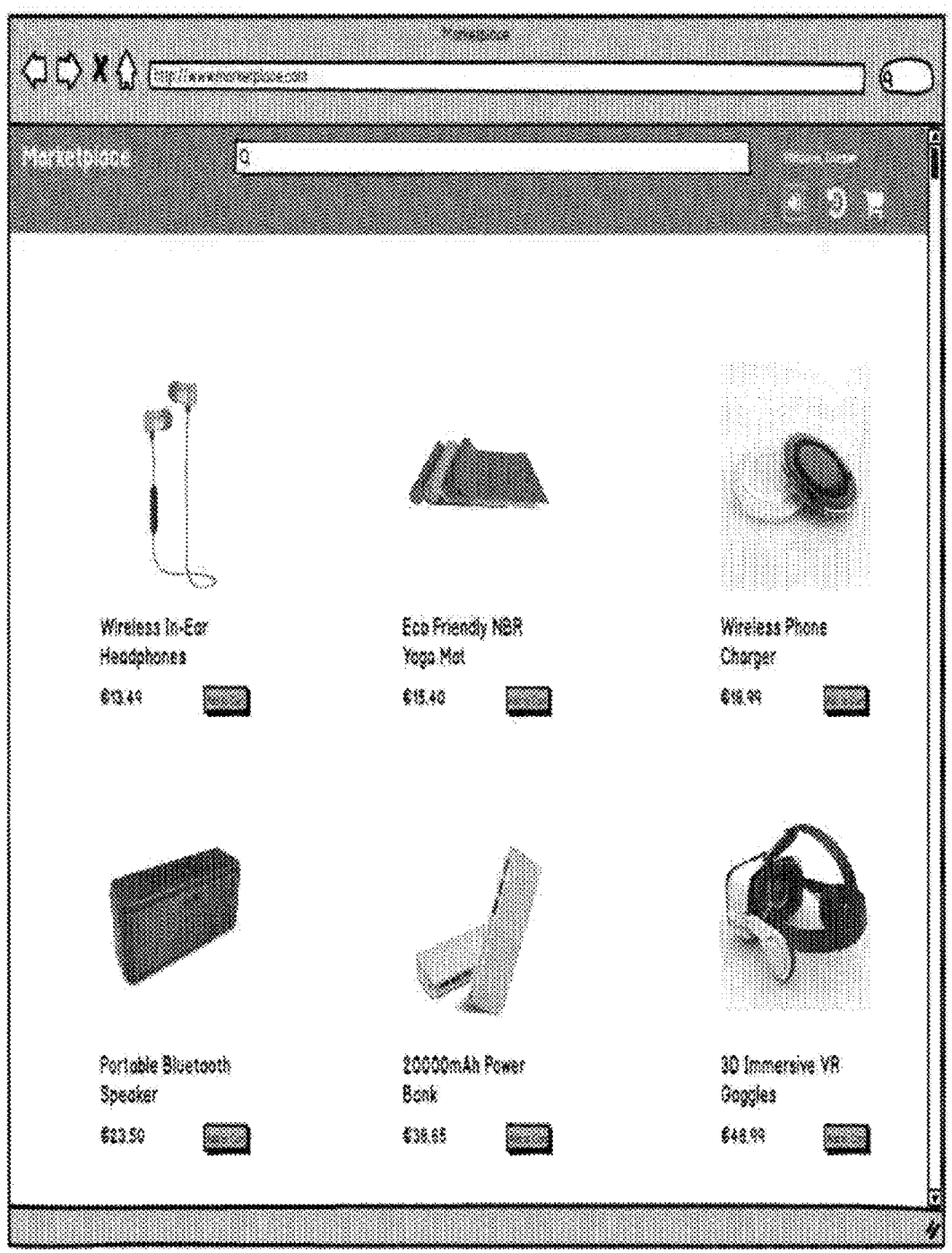
FIG. 8 shows an example of an online eCommerce marketplace after identity verification according to an exemplary embodiment.

In one example, shown generally in FIG. 5, a seller may establish an eCommerce website listing one or more products or services for sale. Of course, one skilled in the art will appreciate that the innovations described herein are equally applicable to a brick-and mortar store or another type of seller-purchaser transaction other than retail. As shown in FIG. 6, an eCommerce website may ask each consumer, upon entry to the site, for access to their identity wallet. In response, purchasers may be given the option of providing access to their identity wallet to the seller at that point or to wait until a transaction is imminent, i.e. at checkout. If the purchaser decides to provide access to their identity wallet, which may be accomplished by the user providing a unique ID or other identifying information (as shown in FIG. 7), the website may be configured to inform the potential purchaser about which information contained in the identity wallet the seller is requesting to access. The purchaser may then select which of the requested information in its identity wallet it wishes to share. If the seller is satisfied with the information permitted to be shared, the user is permitted to continue their use of the seller's website, as shown in FIG. 8. However, if the purchaser (through an automated or manual review, for example) is not satisfied with the amount or type of information that the purchaser is willing to share with the seller, the seller may elect to decline the purchaser further use of the website. For example, a seller may determine that being allowed to know a purchaser's residency information is a prerequisite for use of the website, but may determine that access to a purchaser's personal purchasing history is an optional piece of information to be shared.

Figure 2:
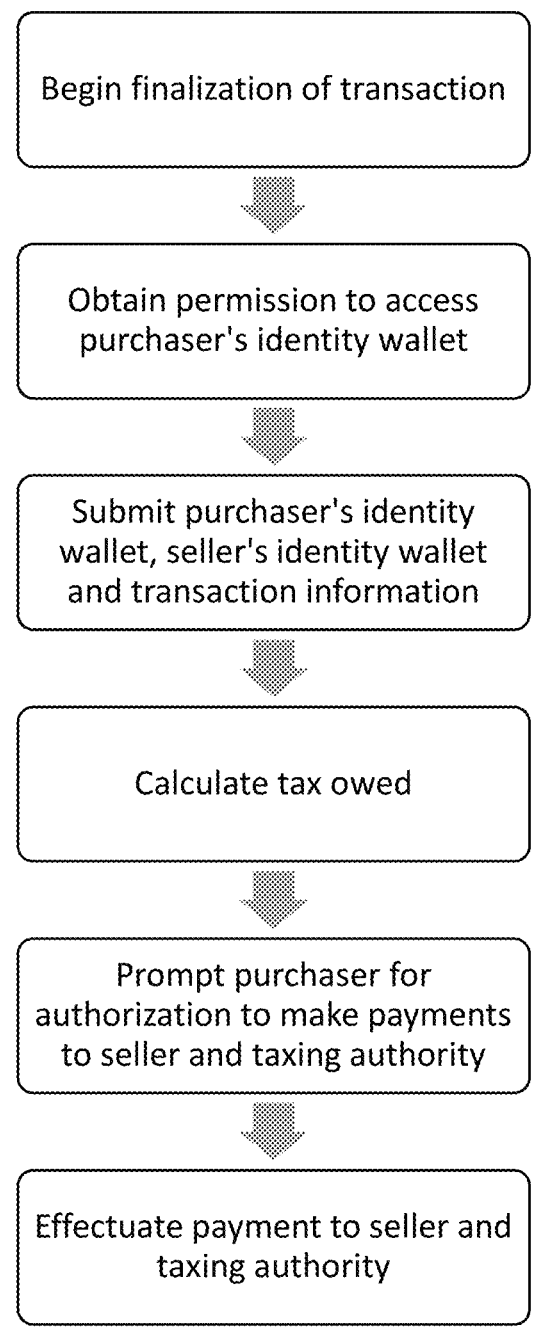
FIG. 2 shows a block diagram illustrating an example of a transaction process flow according to an exemplary embodiment.
Figure 9:
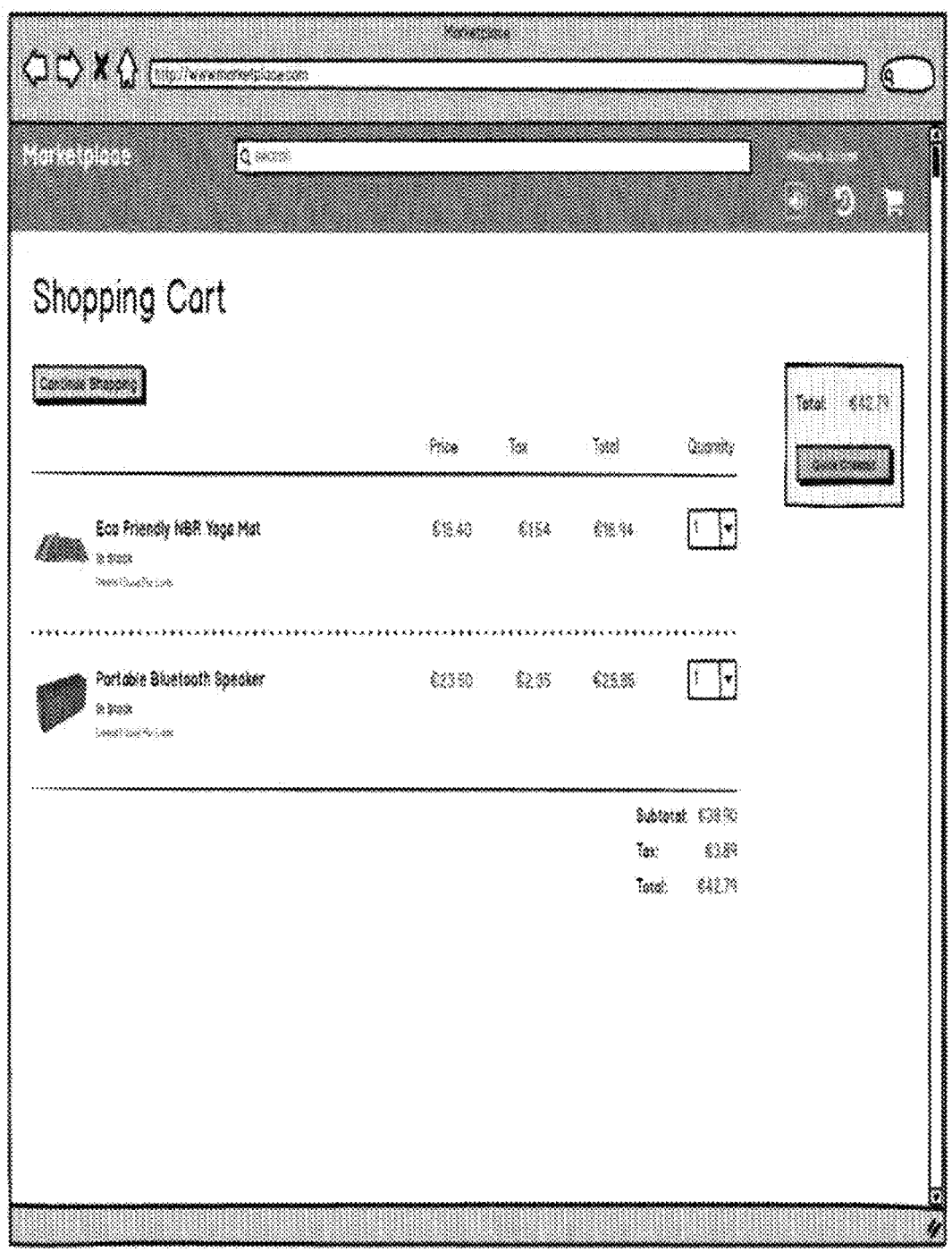
FIG. 9 shows an example of a shopping cart on an online eCommerce marketplace according to an exemplary embodiment.
Figure 10:
FIG. 10 shows an example of a shipping address verification on an online eCommerce marketplace according to an exemplary embodiment.
Figure 11:
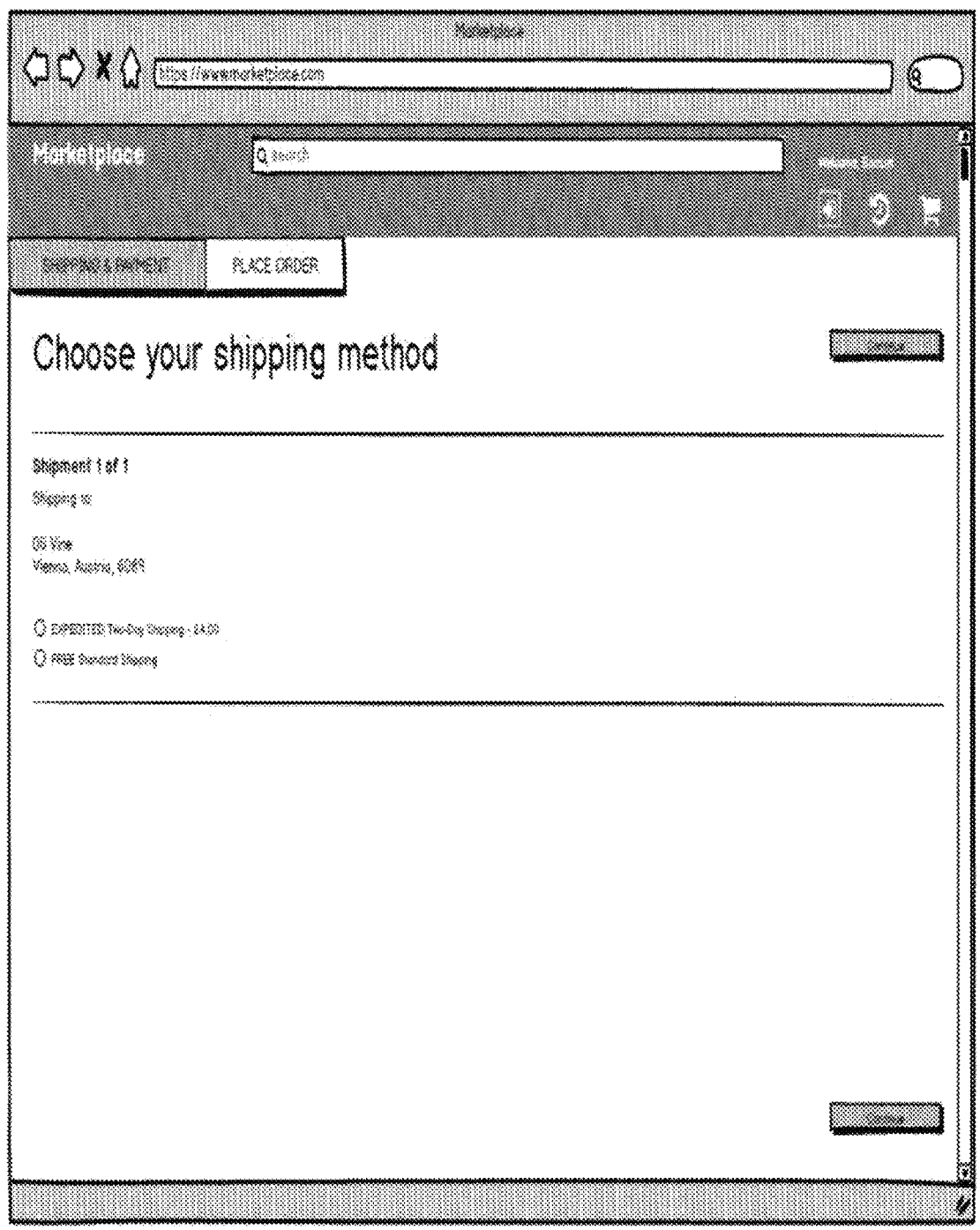
FIG. 11 shows an example of a shipping method verification on an online eCommerce marketplace according to an exemplary embodiment.
Figure 12:
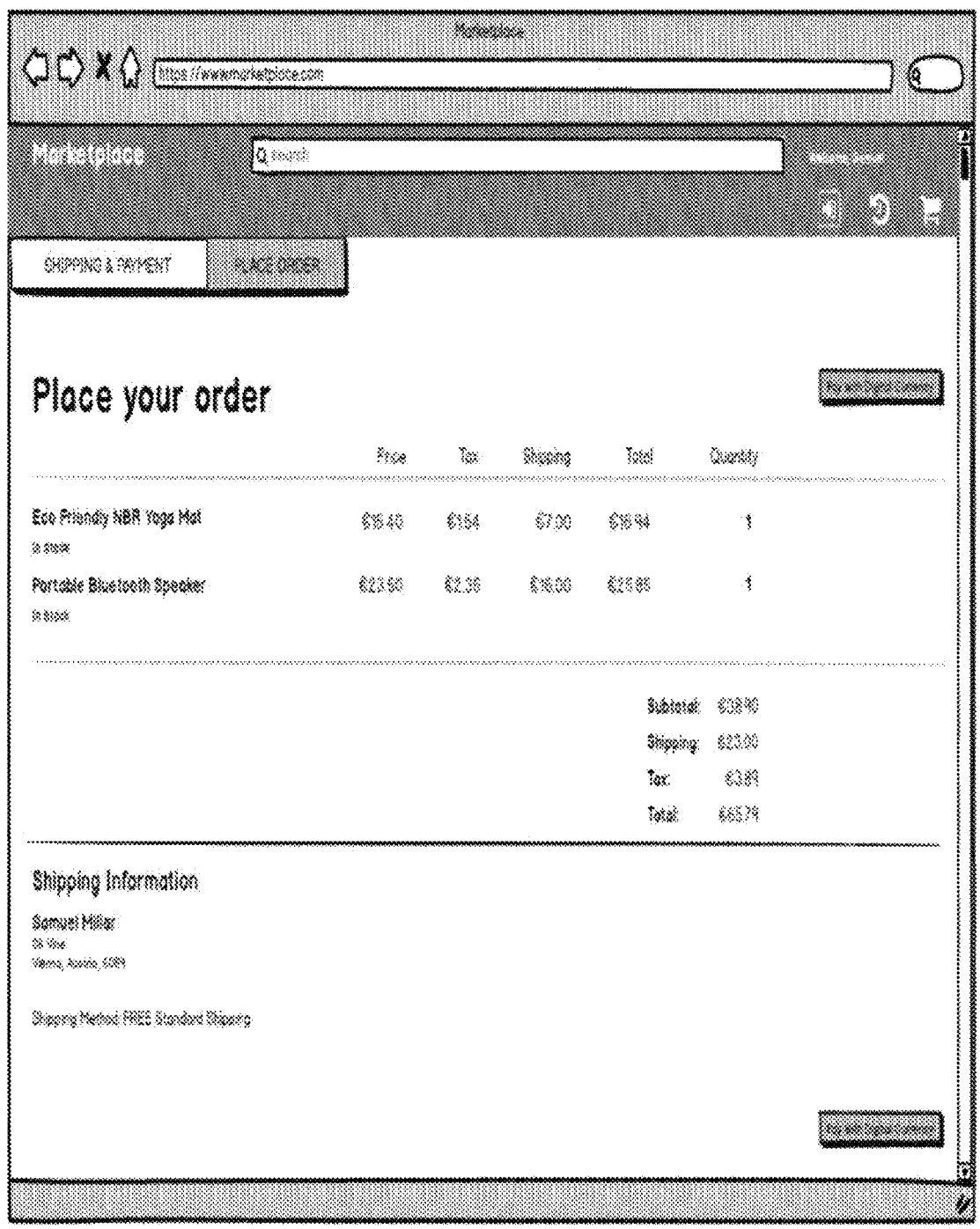
FIG. 12 shows an example of an order placement page of an online eCommerce marketplace according to an exemplary embodiment.
Figure 13:
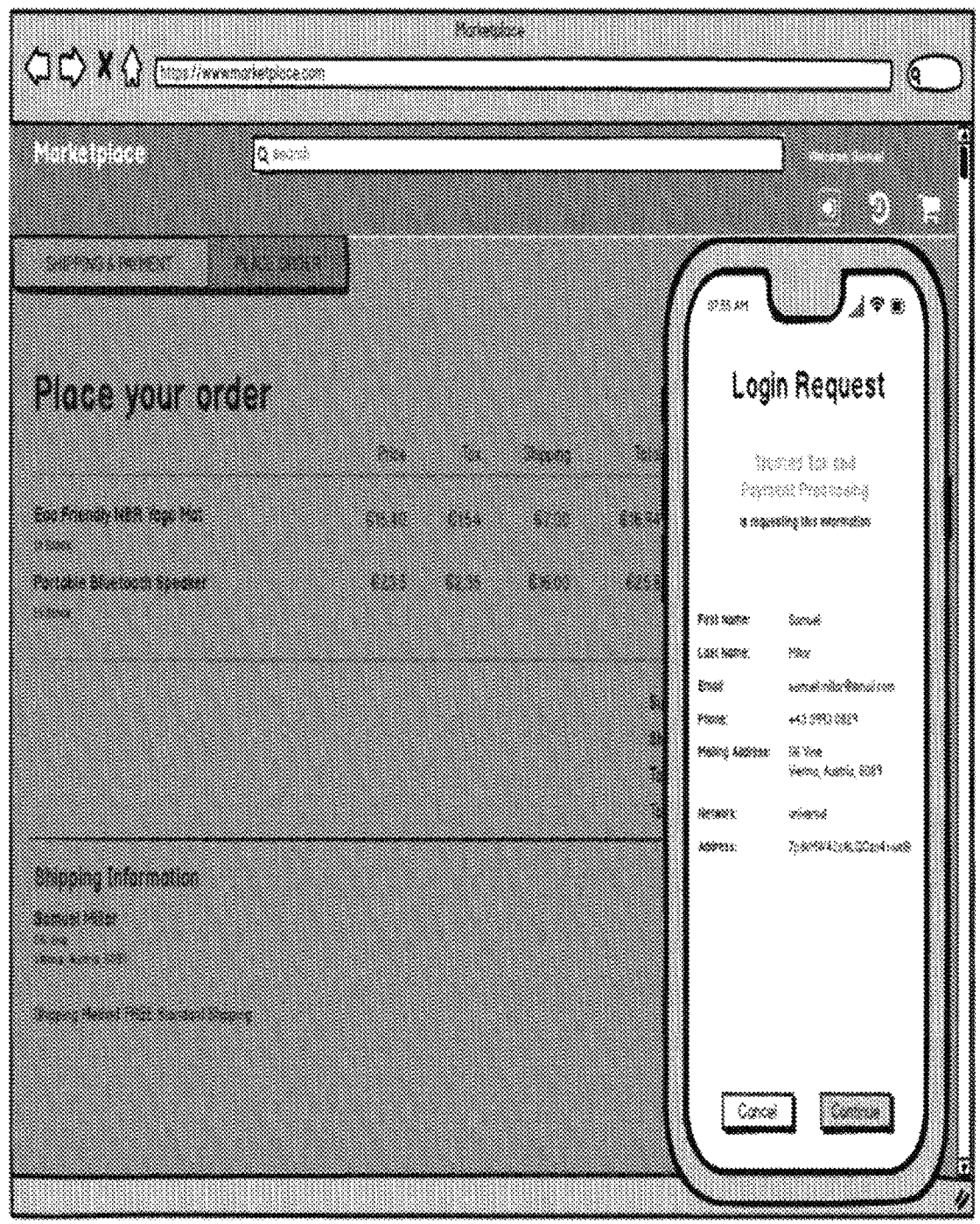
FIG. 13 shows an example of a pre-payment login request on an online eCommerce marketplace according to an exemplary embodiment.
Figure 14:
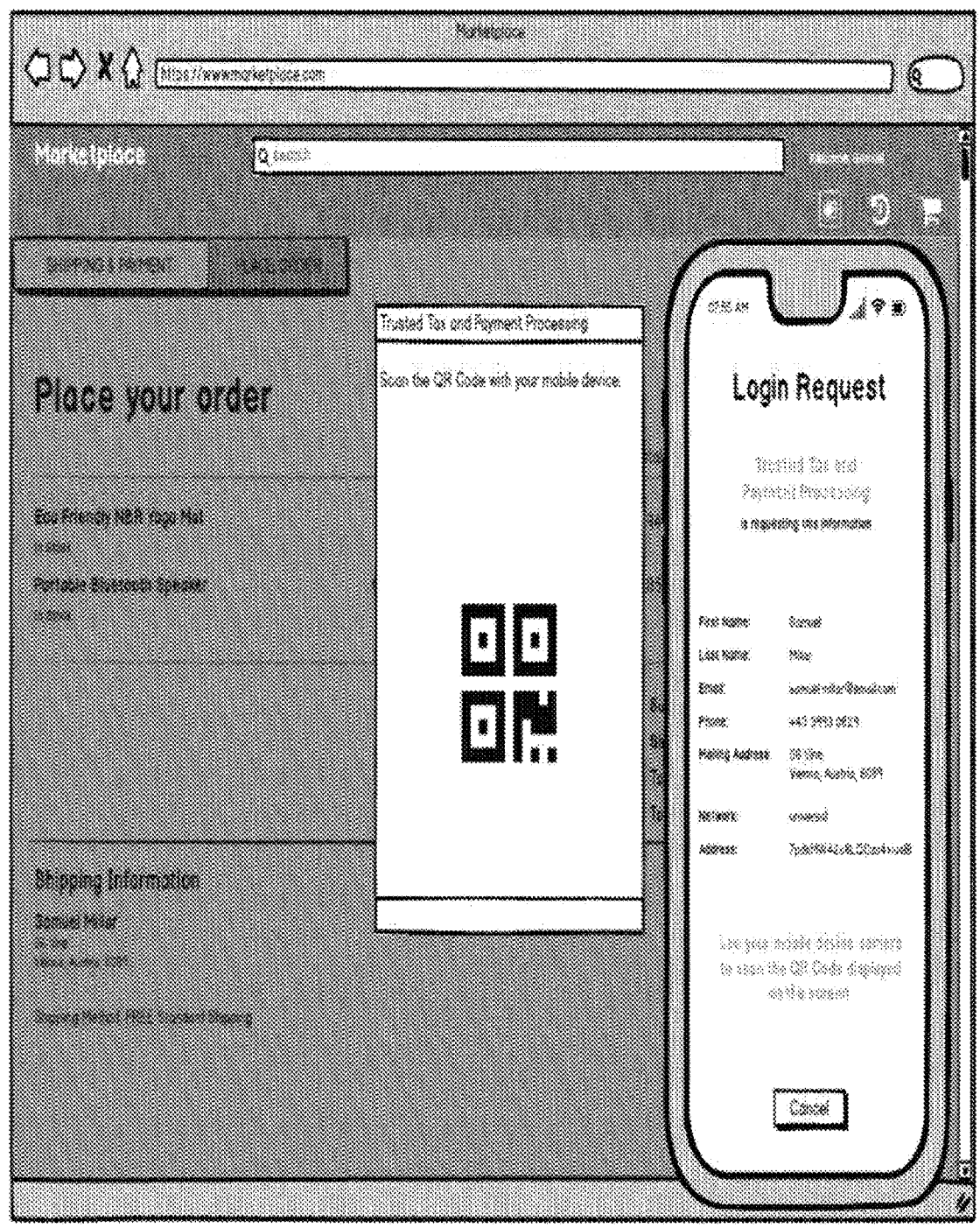
FIG. 14 shows an example of a pre-payment identification verification on an online eCommerce marketplace according to an exemplary embodiment.

A consumer peruses the eCommerce site and places goods or services in a virtual shopping cart, as shown in FIG. 9. When the consumer is ready, they elect to begin a checkout process, shown generally in FIG. 2. As shown in FIG. 10, the consumer may be asked to verify the delivery address and, as shown in FIG. 11, the delivery method. Based on the information entered so far, the system may request an estimated tax amount from a tax determination service and, as shown in FIG. 12, a final order placement screen may be presented with all transaction information. After a consumer proceeds with the order, if they haven't provided it already, the consumer will be prompted to provide their identity wallet information to continue the transaction, as shown in FIG. 13. The consumer may be prompted to provide their specific identity information via an application installed on a mobile device, as shown in FIG. 14. At this stage, the seller may choose to only request access to the minimum information needed for tax purposes, for example the consumer's residency location and tax exemption or reduction status. If the consumer fails to provide access to a sufficient amount of information from their identity wallet, the seller may have the option of declining the sale or continuing using a default set of information. For example, a brick and mortar store may use as default information for tax purposes (e.g., in an "uncertified sale") its own physical location.

Figure 15:
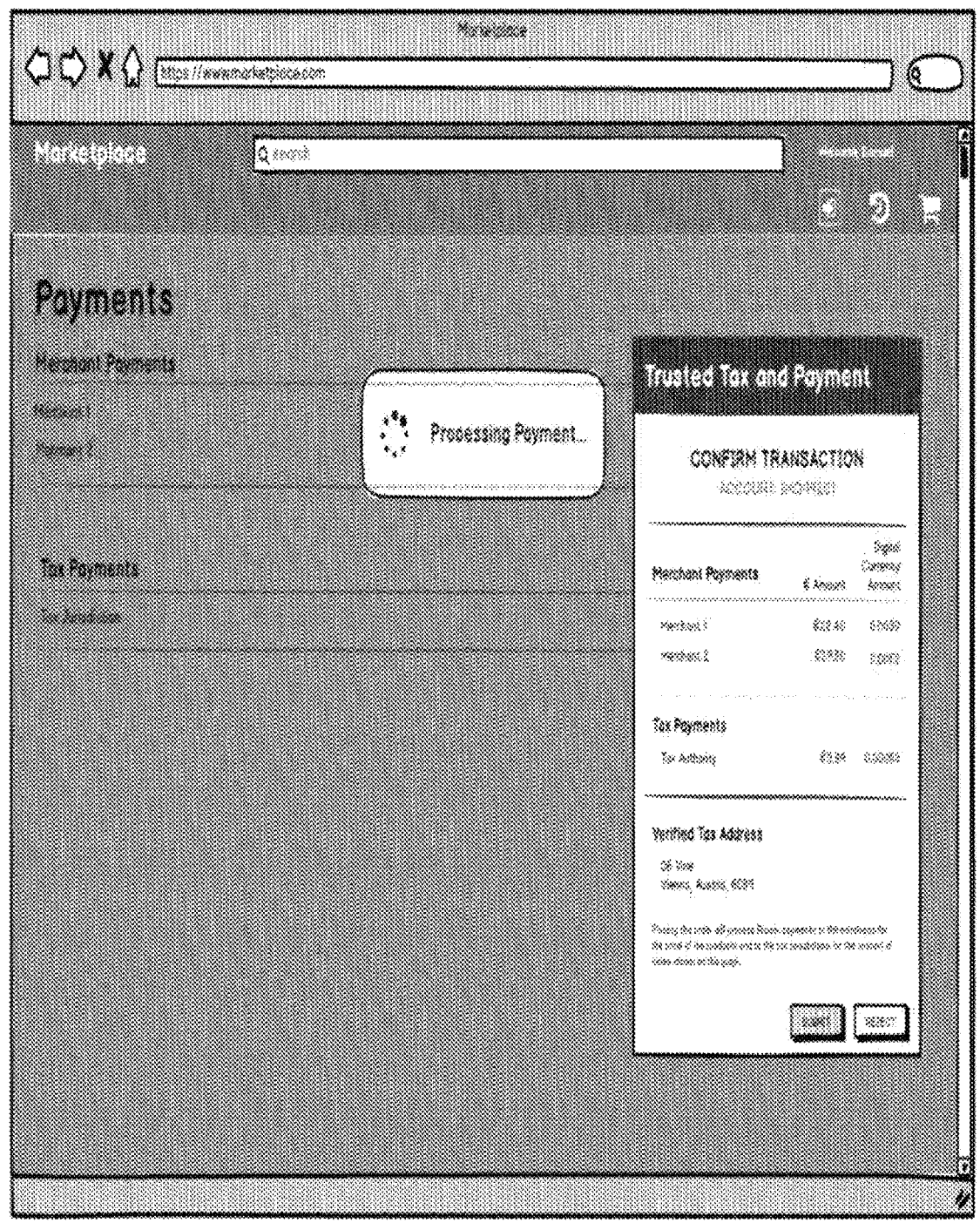
FIG. 15 shows an example of a payment verification on an online eCommerce marketplace according to an exemplary embodiment.
Figure 16:
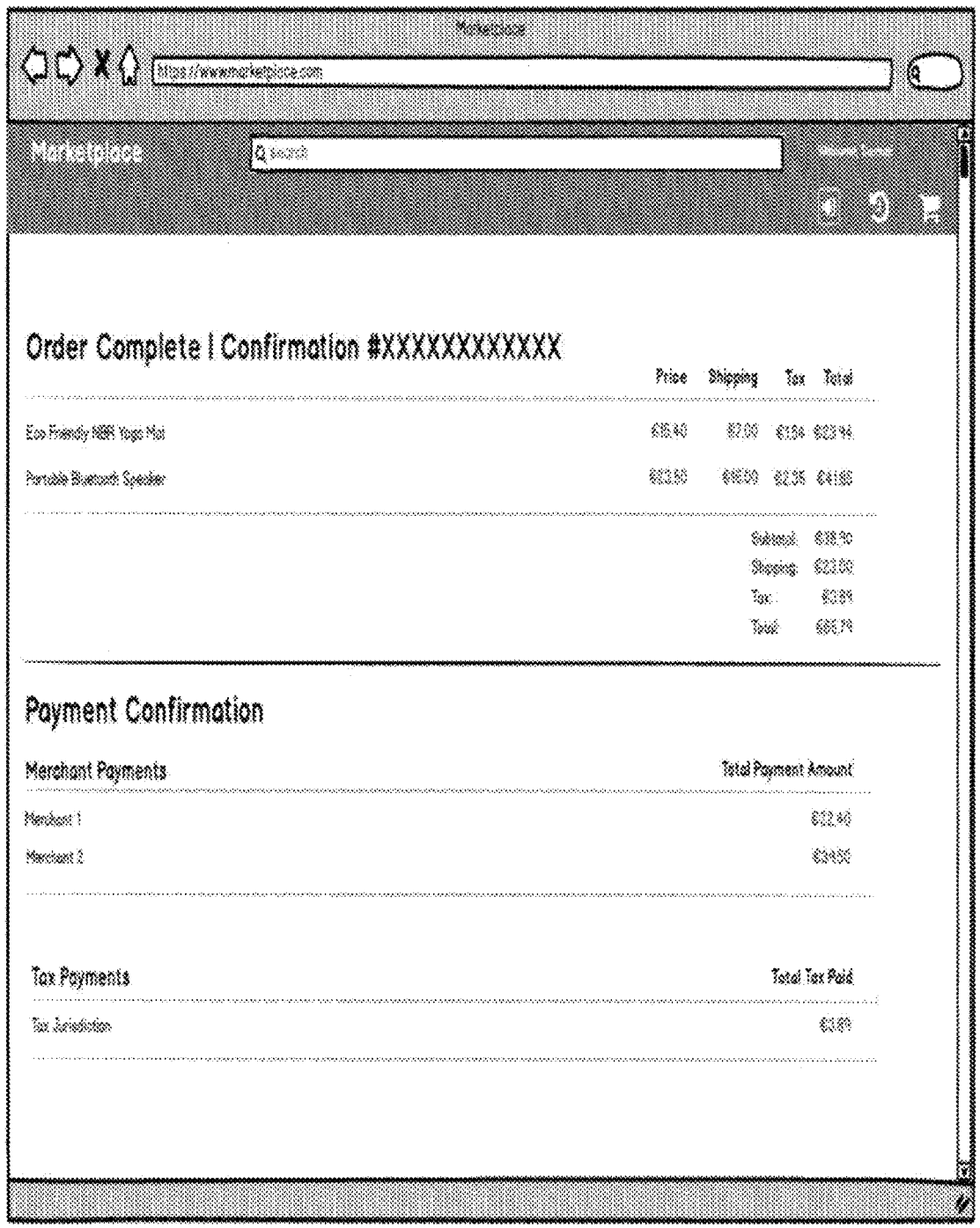
FIG. 16 shows an example of an order and payment confirmation on an online eCommerce marketplace according to an exemplary embodiment.

Next, the transaction information is sent to the verified tax determination engine for final computation of the appropriate tax. Then, just prior to payment, the consumer is prompted for final authorization to pay the appropriate amounts to the seller for the good or service that is the subject of the transaction and the appropriate amount of tax, calculated by the inventive system, to the appropriate governmental body, as shown in FIG. 15. The calculation of the appropriate amount of tax is accomplished using as inputs the identity wallet information of the seller and purchaser as well as an information about the good or service that is the subject of the transaction. Following final authorization from the consumer, the appropriate transactions are carried out on the distributed ledger(s) to effectuate the payment to the seller and to the governmental body.

In one example, the payment of tax to the governmental body is accomplished via a smart contract that acts as a tax reserve account. Such account is owned by the governmental body, but the governmental body may elect to outsource control of the account to a third party. The tax reserve account collects tax and is configured with a predetermined reserve amount to cover the refund of taxes in connection with consumers returning goods. In the case of a return transaction, for example, an identification of the original transaction and which item on that transaction may be passed to a smart contract with a record of the transaction for verification and recordation prior to refund of the purchase price for the returned item. Any amount of tax contributed to the reserve account in excess of the predetermined reserve amount may be transferred to a different account of the governmental body.

In one aspect, the use of blockchain technology, the technology behind cryptocurrencies such as Bitcoin and Ethereum, may play a central role in the administration of the inventive system. At the core of blockchains are collections of data called blocks. Each block is the result of multiple mathematical computations on some transactions. For example, a transaction might be sending Bitcoin to a Bitcoin address in the case of the Bitcoin network or executing a function in a smart contract in the case of Ethereum. Once the block is computed, it is sent to other nodes (miners) in the network for confirmation and, once a majority of nodes have verified the block, it is made the most recent block. The next block must use a seed based on the hash of the current block, chaining block together and repeating the cycle.

The users who do the required computation on the network for the next block receive a digital asset, such as Bitcoin, for their efforts. This process is called mining and is the process which generates new coins on the network. In the Ethereum network, mining is done by processing transactions which can either be calls to programs stored on the Ethereum blockchain or transfers of Ether between users.

In another aspect, smart contracts may be utilized to record elements of a transaction. For example, different smart contracts may be established and maintained using distributed ledger technology to record different elements of a transaction and to aggregate data from multiple transactions.

For example, a "pass through" smart contract may be configured to manage the sending of funds to both the merchant and the tax reserve contracts. The system submits a transaction which lists which merchants to pay, how much to pay the merchants, which tax authorities to pay, and how much to pay the tax authorities. The pass through contract then splits the total payment according to the ether to the corresponding party.

As another example, a "detailed tax escrow" smart contract may be configured to hold taxes sent to it by a user or company as well as additional related information. Such a smart contract may be configured to store all the information relating to a tax payment in the smart contract itself. This may include, for example, the address of the user, the block number, whether or not it was refunded, a transaction ID, and the amount paid.

In another example, a "basic tax escrow" smart contract may be configured to hold tax amounts sent to it by a user or company and to process refunds, but does not store other, more detailed information. In other words, such a "basic tax escrow" smart contract may be used as a simple currency repository.

In yet another example, a "factory" smart contract may be configured to deploy and track all tax escrow contracts. Such a smart contract allows for the deployment of new contracts from trusted sources and can also be configured to permit upgrading and removing other smart contracts as necessary.

Figure 3:
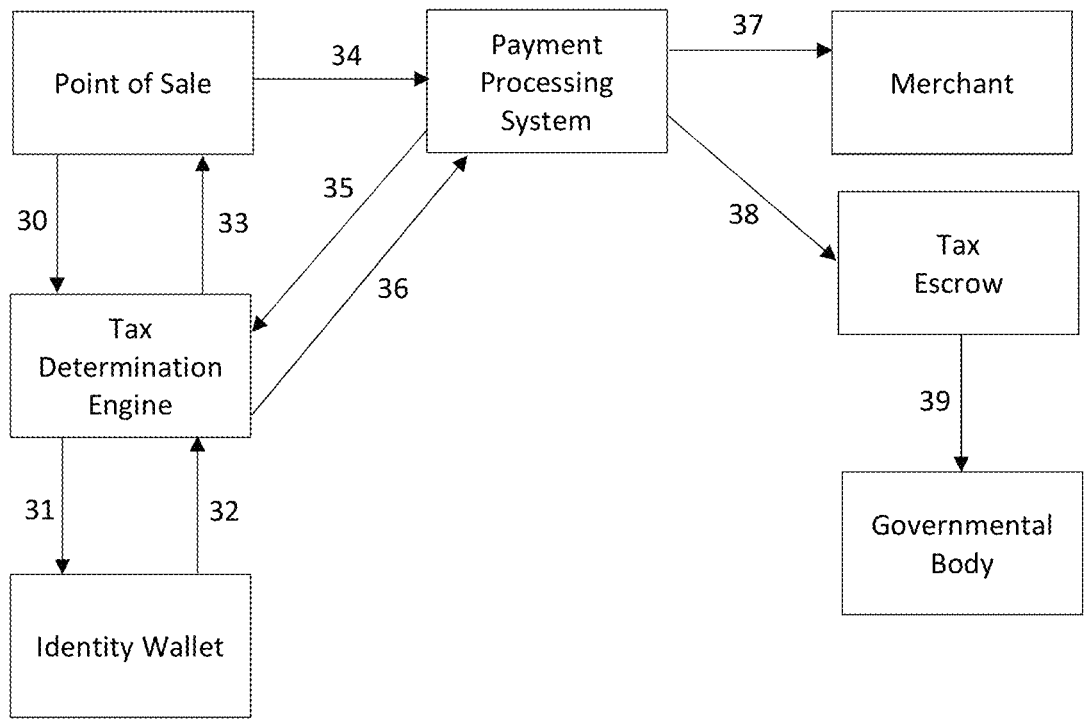
FIG. 3 shows a block diagram of a process for executing a transaction according to an exemplary embodiment.

FIG. 3. is a block diagram depicting an illustrative embodiment of a system according to the present disclosure. As shown in FIG. 3, at the point of sale, which may be, for example, an online eCommerce website with a shopping cart, a transaction is initiated by sending 30 to a tax determination engine information from a purchaser and a seller sufficient to retrieve information from those entities' respective identity wallets as well as information about the transaction. The tax determination engine, using the identity information from the point of sale system, queries 31 a verified identity wallet system for verified identity information relevant to the transaction, which is returned 32 to the tax determination engine. Using the verified identity wallet information and the initially received transaction information, the appropriate amount of tax is determined and communicated 33 to the point of sale. This tax information may also include an identification or the appropriate taxing authority of governmental body to which the tax is owed. The tax information, as well as the transaction information, may be presented to the purchaser for their final approval.

Upon receipt of purchaser approval, the point of sale system may communicate 34 to a payment processing system the transaction and tax information as well as payment information submitted by the purchaser. The payment processing system may communicate 35 the transaction information back to the tax determination information for verification of the actual tax owed. The tax determination engine may be configured to once again provide verified tax information, but this time communicated 36 to the payment processing system. The payment processing system may then record two transactions—first to the merchant 37 for the transaction amount and second 38 to a tax escrow of the taxing authority. The tax escrow may be configured to redirect 39 any tax remittances once the tax escrow is or would be above a predetermined reserve amount.

Figure 4:
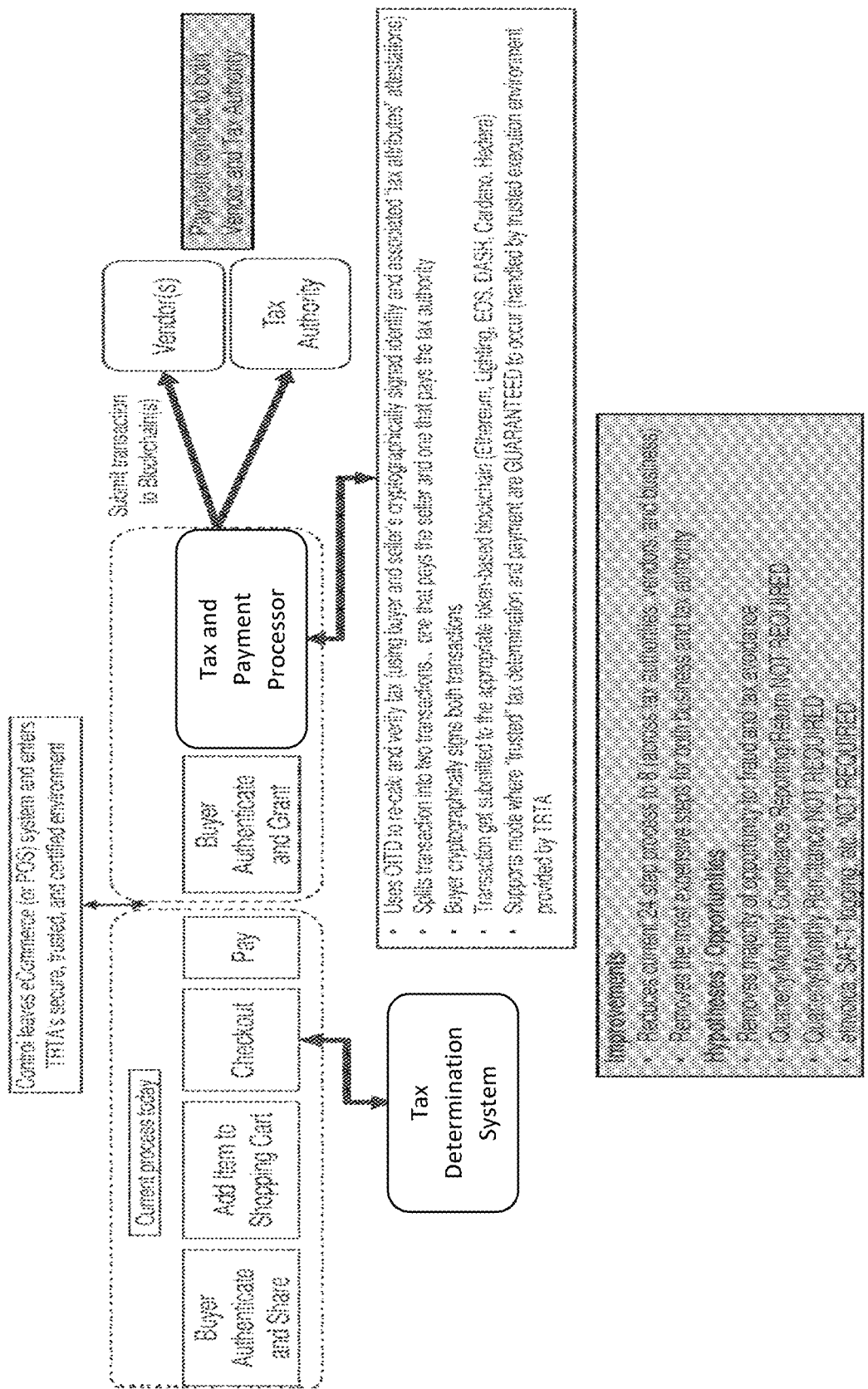
FIG. 4 shows a block diagram of another process for executing a transaction according to an exemplary embodiment.

FIG. 4 depicts another exemplary embodiment in which the current (previous) process is augmented by the buyer authentication aspects, tax payment and processor aspects, and tax determination system of the present disclosure. Dual blockchain transactions are submitted to the vendor and tax authority by the tax and payment processor.

In these examples, because the tax determination engine, identity wallet, and the payment processing system can be verified by governmental bodies, many previously required steps in a transaction and tax reporting thereof may be eliminated. For example, previously, the following 24 steps might have been necessary to implement, collect and report a consumption tax:

1. Tax Authority creates and publishes tax registration regulations
2. Tax Authority creates and publishes tax determination regulations
3. Tax Authority creates and publishes tax compliance/reporting regulations
4. Tax Authority creates and publishes tax transaction (eInvoice, SAF-T) regulations
5. Tax Authority implements registration solutions
6. Tax Authority implements compliance/reporting solutions
7. Tax Authority implements Invoice/SAF-T logging solutions
8. Vendors implement tax determination solutions
9. Vendors' solution certified
10. Vendors implement tax compliance/reporting solutions
11. Vendors implement Invoice/SAF-T logging solutions
12. Business(es) register for VAT
13. Business(es) setup tax determination solution (only eCommerce and POS solutions setup to use the T &PS)
14. Business(es) setup tax compliance/reporting solution
15. Business(es) setup invoice/SAF-T logging or real-time invoice requests
16. Business(es) execute tax determination on every transaction
17. Business(es) frequently (e.g., daily) log Invoices/SAF-T to Tax Authority—OR—request and process real-time valid invoice numbers.
18. Business(es) periodically (e.g., quarterly) gather all of their detailed transactions for the period and create a tax return/report. File the return and remit their tax due.
19. Tax Authority receives tax return and processes (e.g., analyze data compliance/fraud).
20. Tax Authority receives tax remittance.
21. Tax Authority receives Invoice/SAF-T logs and processes (e.g., analyze data for compliance/fraud).
22. Tax Authority selects business for audit.
23. Tax Authority and Business work together to gather/exchange data and perform audit.
24. Tax Authority and Business work together to close Audit and finalize Settlement.

However, under the system proposed herein, the most expensive steps of the previous process are eliminated, and the steps that remain become necessary for only a few vendors rather than every business. In the proposed system, the steps are:

1. Tax Authority creates and publishes tax registration regulations
2. Tax Authority creates and publishes tax determination regulations
3. Tax Authority implements registration solution
4. Vendors implement Real-Time: Tax & Payment Solution ("T&PS")
5. Vendors' solution certified
6. eCommerce and POS systems setup Determination and T&PS. Each business doesn't need to separately setup.
7. eCommerce and POS systems execute Determination and T&PS. Each business doesn't need to separately execute.
8. Tax Authority receives tax remittance.

Governments of the world bear the lion's share of the burden of ensuring tax compliance. Using the present system, tax authorities will dramatically cut down on oversight costs. The need to determine the appropriate amount to tax due will be automated thus cutting down on a considerable amount of expense. Only transactions that are irregular will trigger a need for further audit.

The average business spends between $3,000-$500,000 per year on compliance with $15,000 being the average. Much of this expense can be attributed to the way tax is determined. The present solution removes the duplication of efforts by ensuring all payment made through the system will automatically have tax determination, remittance and attribution. Tax authorities will have a clear audit trail if irregularities are noted. This automated process removes overhead for business and significantly reduces risk of audit.

Calculating taxes owed across multiple jurisdictions can be a laborious process. These processes can be automated by a system that takes into account the jurisdiction along with the identity of sellers and goods. Tax that needs to be reclaimed or claimed would be done so instantaneously.

In a future in which IOT devices produce a great deal financial microtransactions in the form of machine-to-machine connections, transactions must be underpinned by a tax infrastructure, such as the one proposed herein, that can support a high throughput infrastructure.

Users of the present system will be in complete control of their personal data through the identity verification systems proposed herein. Identity and access control may be managed through the individual's mobile device. Only parties that have asked for permission will be able to access data. This permission can be revoked at any time. Identity ownership is determined by possession of a digital private key that controls a public key associated with the identity. If a private key is lost or stolen, user identities can be recovered by having trusted friends or institutions attest to the change. This decentralized model places the power of control in the hands of the user ensuring that private data cannot be exposed.

Although the above description focuses on an example in which a seller's point of sale system interfaces with and includes aspects of the described system, another possible implementation is that of an online marketplace administered by a single entity in which many different sellers participate. eBay and Amazon, for example, are marketplaces in which many sellers participate and offer their products and services for purchase. A system according to the present invention may be deployed by such a marketplace for many or all of the sellers in its platform to use.

FIGS. 1 through 16 are conceptual illustrations allowing for an explanation of the present disclosure. It should be understood that various aspects of the embodiments of the present disclosure could be implemented in hardware, firmware, software, or combinations thereof. In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, the applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

In order to address various issues and advance the art, the entirety of this application for SYSTEMS AND METHODS FOR AIDING TAX COMPLIANCE (including the Cover Page, Title, Headings, Cross-Reference to Related Application, Background, Brief Summary, Brief Description of the Drawings, Detailed Description, Claims, Figures, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of an individual and/or enterprise user, database configuration and/or relational model, data type, data transmission and/or network framework, syntax structure, and/or the like, various embodiments may be implemented that enable a great deal of flexibility and customization. While various embodiments and discussions have included reference to applications in the retail and blockchain contexts, it is to be understood that the embodiments described herein may be readily configured and/or customized for a wide variety of other applications and/or implementations.

What is claimed is:

1. A system for calculating and remitting tax obligations, the system comprising at least one processor, the system in communication with a consumer device and a point of sale system to improve functioning of the consumer device and point of sale system using distributed ledger technology, wherein the system is configured to:

receive, via the at least one processor, a first identification of an item to be purchased via the point of sale system;

in response to an electronic interface of the point of sale system being accessed by the consumer device, generate an identification verification request configured for presentation via the electronic interface of the point of sale system;

receive, from the consumer device, an access authorization for digital data associated with a consumer identifier related to the consumer device in response to the identification verification request;

receive, via the at least one processor and in response to the access authorization received from the consumer device, a second identification of an identity wallet configured as a distributed ledger repository for the digital data associated with the consumer identifier related to the consumer device, the identity wallet being verified by a government or an agent thereof, and the digital data associated with the identity wallet being distributed via one or more network nodes of a network;

using the second identification of the identity wallet, query, via the network and the at least one processor, the identity wallet to obtain at least a portion of the digital data associated with the identity wallet based on a distributed ledger protocol configured for the distributed ledger repository;

using at least the portion of the digital data associated with the identity wallet, together with the first identification of the item to be purchased, calculate tax data associated with the item to be purchased and determine a taxing authority identifier for the tax data;

based on the first identification of the item to be purchased, initiate a first cryptocurrency transaction to transfer a purchase price of the item to the point of sale system associated with the item via the network; and initiate a second cryptocurrency transaction to transfer the tax data to a tax reserve system associated with the taxing authority identifier via the network, wherein the first cryptocurrency transaction and the second cryptocurrency transaction improve efficiency of network interactions with respect to the consumer device and point of sale system.

2. The system of claim 1, wherein the second cryptocurrency transaction is recorded in a smart contract on a distributed ledger.

3. The system of claim 1, wherein the one or more network nodes are associated with a distributed ledger.

4. The system of claim 1, wherein the system is further configured to obtain verified information related to a seller identifier associated with the point of sale system from a different identity wallet associated with the seller identifier, wherein the calculation of the tax data is further based on the verified information obtained from the different identity wallet.

5. The system of claim 1, wherein the system is further configured to present the tax data via the consumer device, and to proceed with the first cryptocurrency transaction and the second cryptocurrency transaction in response to a consent indication being received from the consumer device.

6. The system of claim 1, wherein the second cryptocurrency transaction records, in addition to the transfer of tax data, the consumer identifier and a seller identifier associated with the point of sale system involved in the second cryptocurrency transaction.

7. The system of claim 1, wherein the tax reserve system is configured with a predetermined reserve threshold and any tax transferred to the tax reserve in excess of the predetermined reserve threshold is transferred to one or more other tax reserve systems associated with the tax authority identifier.

8. The system of claim 1, wherein the system is further configured to:

receive an item return request from the consumer device indicating a returned item and an identification of the second cryptocurrency transactions initiated in connection with an initial purchase of the item; and initiate a third cryptocurrency transaction with the tax reserve system including the identification of the second cryptocurrency transaction and a different identification of the returned item to transfer at least a portion of the tax data transferred via the second cryptocurrency transaction that is attributable to the returned item back from the tax reserve.

* * * * *